(12) United States Patent
Gogic

(10) Patent No.: US 7,881,444 B2
(45) Date of Patent: Feb. 1, 2011

(54) APPARATUS, SYSTEM, AND METHOD FOR PROVIDING VOICEMAIL SERVICE USING PRESENCE STATUS IN PACKET DATA MESSAGING SYSTEM

(75) Inventor: Aleksandar Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 11/133,654

(22) Filed: May 19, 2005

(65) Prior Publication Data

US 2006/0003745 A1 Jan. 5, 2006

Related U.S. Application Data

(60) Provisional application No. 60/574,757, filed on May 26, 2004.

(51) Int. Cl.
*H04M 1/64* (2006.01)

(52) U.S. Cl. ............. 379/88.23; 379/88.13; 379/201.1; 379/207.08; 379/211.02; 455/456.1

(58) Field of Classification Search ............. 379/201.1, 379/207.08, 211.01–211.02, 67.1, 207.05, 379/265.06, 88.13, 88.22–88.26, 210.01; 455/416, 417, 456.1–456.3; 709/203; 705/412; 707/4; 370/395.4
See application file for complete search history.

(56) References Cited

U.S. PATENT DOCUMENTS

| | | | |
|---|---|---|---|
| 5,881,104 A | 3/1999 | Akahane | |
| 6,563,912 B1 | 5/2003 | Dorfman et al. | |
| 6,751,298 B2 | 6/2004 | Bhogal et al. | |
| 6,795,541 B2 | 9/2004 | Oren | |
| 6,993,497 B2 | 1/2006 | Yeh et al. | |
| 7,123,697 B2 | 10/2006 | Amir et al. | |
| 7,555,108 B2 | 6/2009 | Sylvain | |
| 2001/0013052 A1* | 8/2001 | Benjamin et al. | 709/203 |
| 2002/0085701 A1* | 7/2002 | Parsons et al. | 379/211.01 |
| 2003/0061179 A1* | 3/2003 | Reece | 705/412 |
| 2003/0169865 A1 | 9/2003 | Oren | |
| 2004/0062383 A1* | 4/2004 | Sylvain | 379/265.06 |
| 2004/0083212 A1* | 4/2004 | Palmquist | 707/4 |
| 2005/0009537 A1* | 1/2005 | Crocker et al. | 455/456.3 |
| 2005/0202806 A1* | 9/2005 | Bourgeois et al. | 455/416 |
| 2005/0239454 A1 | 10/2005 | Kawashima et al. | |
| 2006/0195540 A1 | 8/2006 | Hamilton et al. | |

FOREIGN PATENT DOCUMENTS

| | | |
|---|---|---|
| EP | 0913982 | 5/1999 |
| EP | 1071295 | 1/2001 |
| EP | 1139677 | 4/2001 |
| KR | 1019990016902 | 3/1999 |
| KR | 1019990016903 | 3/1999 |

* cited by examiner

*Primary Examiner*—MD S Elahee
(74) *Attorney, Agent, or Firm*—Kam T. Tam; Espartaco Diaz Hidalgo

(57) ABSTRACT

An apparatus, system, and method provide voicemail service using a packet data messaging service such as multimedia message service (MMS). Upon detecting that the presence status of a destination device is "unavailable", the voicemail message is recorded at an origination mobile station and transmitted in a packet data message through a packet data messaging service center such as a multimedia messaging service center (MMS-C). If the destination device is a destination mobile station subscribing to the packet data messaging service, the packet data message is deposited in the destination mobile station.

4 Claims, 4 Drawing Sheets

APPARATUS, SYSTEM, AND METHOD FOR PROVIDING VOICEMAIL SERVICE USING PRESENCE STATUS IN PACKET DATA MESSAGING SYSTEM

CLAIM OF PRIORITY UNDER 35 U.S.C §119

The present Application for Patent claims priority to U.S. Provisional Application No. 60/574,757, entitled "Interworking Between Wireless Voicemail and MMS to Achieve Efficient Use of Network Resources", filed May 26, 2004, and assigned to the assignee hereof and hereby expressly incorporated by reference herein.

RELATED APPLICATION

This application is also related to US utility application entitled "Apparatus, System, And Method for Providing Voicemail Service Using a Packet Data Messaging System", having Ser. No. 11/133,655 and filed concurrently herewith this application.

BACKGROUND

I. Field

The invention relates in general to voicemail systems and more specifically to an apparatus, system, and method for providing voicemail service through a packet data messaging system.

II. Background

Voicemail systems provide a mechanism for an origination party to record a voice message that can be retrieved by a destination party. Typically, a voicemail box associated with a telephone number of the destination party is used to store the voicemail message. The destination party retrieves the message by accessing a voicemail server that maintains the voicemail box and by entering the appropriate identification and security information. In conventional voicemail systems, a real-time call such as a circuit switched call or a virtual circuit switched call is maintained with the voicemail server while voicemail message is deposited or retrieved. In circumstances where communication resources are limited, however, conventional systems have substantial drawbacks. In conventional wireless communication systems, for example, bandwidth and communication channels are valuable resources that are often used for retrieving and depositing voicemail messages. Since only one party is involved with the transfer of a voicemail message at any particular time, a low latency, real-time communication link is not required. Using a circuit switched call in a circuit switched network, or a virtual circuit switched call in a packet switched network, to deliver or retrieve voicemail messages results in an inefficient use of wireless resources. In systems utilizing packet switched networks such as VoIP (Voice over Internet Protocol) networks, for example, establishing a real-time call for a voicemail submission or retrieval results in an inefficient use of resources since a voice quality call is established for the virtual circuit switched connection. Data packets exchanged during the voicemail call are unnecessarily treated as high priority, low latency data packets required for a real-time call.

Accordingly, there is a need for an apparatus, system, and method for efficiently providing voicemail services in a wireless communication system.

DETAILED DESCRIPTION OF THE PREFERRED EMBODIMENTS

An apparatus, system, and method efficiently provide voicemail services in a wireless communication system. Voicemail messages are deposited and retrieved using a packet data messaging system such as a multimedia message service (MMS) system. Resources are efficiently managed by minimizing the durations of real-time calls in the wireless communication system. Voicemail messages are exchanged using higher latency packet data transmissions than required for voice quality calls. Voicemail messages deposited by a wireless user are recorded at an origination mobile station and transmitted through a packet data communication link as a packet data message. Voicemail messages retrieved by a wireless user are received at a destination mobile station through a packet data communication link and stored in memory at the mobile station. Employing a packet data messaging system maximizes the efficiency of the use of wireless communication resources for voicemail services. Since a greater degree of latency can be tolerated with the transmission of a packet data message, for example, the packet data message that includes a voicemail message can be efficiently transferred at a lower QoS (quality of service) level than required by virtual circuit switched calls in packet switched networks. Communication resources are, therefore, efficiently assigned using a QoS policy that may result in increased latency while employing channels having a higher data transfer rate than a virtual circuit switched call.

Figure 1:
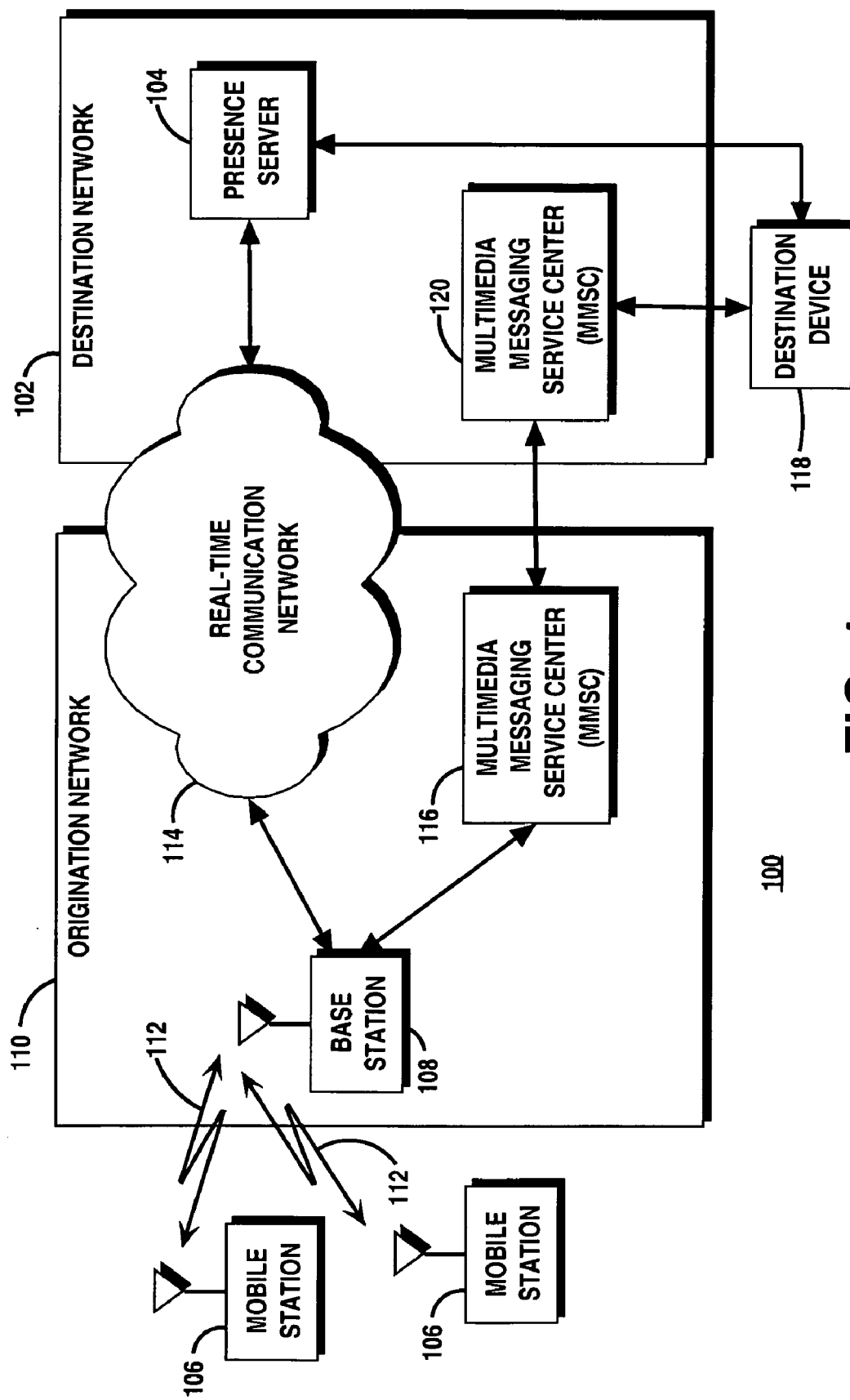
FIG. 1 is a block diagram of a communication system in accordance with an exemplary embodiment of the invention.

FIG. 1 is a block diagram of a communication system 100 in accordance with an exemplary embodiment of the invention. Origination mobile stations 106 communicate with a base station 108 of an origination network 110 through wireless communication channels 112. At least a portion of the origination network 110 includes a wireless communication system which may be any cellular, radio, optical, or other wireless system that facilitates the wireless exchange of signals with at least one mobile unit 106. Examples of suitable wireless communication systems include cellular telephone systems operating in accordance with Code Division Multiple Access (CDMA) or Global System for Mobile Communication (GSM) standards. The wireless communication system of the origination network 110 has one or more base stations 108 that exchange wireless signals with the mobile stations 106 to establish communication with the mobile stations 106. The base stations 108 are connected to a real-time communication network 114 that routes mobile station calls in accordance with known techniques. The real-time communication network 114 includes any combination of routing and/or switching equipment, communication links, and other infrastructure suitable for establishing a real-time communication link between the base station 108 and a destination device 118 in the destination network 102. In the exemplary embodiment, the real-time communication network 114 is a packet switched network comprising one or more Internet Protocol (IP) routers that facilitate the exchange of data packets using Internet Protocol (IP) to establish a virtual circuit switched communication link between the base station 108 and the destination device 118. In accordance with known techniques, a real-time call can be established between a mobile station 106 and the destination device 118 by prioritizing and managing the transmission of data packets. The real-time communication network 114 includes equipment for interfacing and managing communications with the mobile station 106 through the base station 108. For example, the real-time communication network 114 may include a mobile switching center emulator (eMSC) in some situations. The cloud representing the real-time communication network 114 in the FIGS. is shown overlapping the origination network 110 and the destination network 102 to illustrate that components within the origination network 110 and the destination network 102 can be considered as part of the real-time communication network 114. Further, some of the equipment and infrastructure used to establish communication through the real-time communication network 114 may be utilized by the packet data messaging system discussed immediately below.

A packet data messaging system transmits data packets through the packet switched network to exchange messages containing the voice mail messages. The packet data messaging system may be any type of packet data system that provides a mechanism for routing data packets that contain files or other information representing the contents of voicemail messages. An example of a suitable packet data messaging system includes an electronic mail (email) system that is capable of routing email messages having attached audio files. In the exemplary embodiment, the packet data messaging system is a multimedia messaging service (MMS) system that facilitates the exchange of text, video, audio and graphics files between appropriately equipped mobile stations 106 and other devices serviced by the MMS system. The other devices may be serviced by the same wireless network, a different wireless network, a wired network, or a computer network. A packet data messaging service center stores and manages the packet data messages exchanged with the mobile stations 106. In the exemplary embodiment the packet data message service center is a multimedia messaging service center (MMS-C) 116 that stores and manages multimedia messages exchanged with the mobile stations 106. The MMS-C 116 includes a MMS server and a MMS relay (not shown in FIG. 1). In some circumstances, other equipment, servers, networks, and storage may be connected to the MMS-C 116. For example, temporary message storage devices and permanent message storage devices may be used to store MMS messages. Those skilled in the art will readily recognize the various topologies, protocols, architectures, and implementations of the communication system 100, origination network 110 and destination network 102 that can be used based on these teachings as applied to known techniques. The functions and operations of the blocks described in FIG. 1 may be implemented in any number of devices, circuits, or infrastructure. Two or more of the functional blocks may be integrated in a single device and the functions described as performed in any single device may be implemented over several devices. For example, the communication link between the base station 108 and the MMS-C 116 includes other distinct origination network 110 elements not shown in FIG. 1 such as a base station controller (BSC) and a packet data access gateway switching node (PDSN).

In the exemplary embodiment, the communication system 100 utilizes Voice over Internet Protocol (VoIP) techniques over packet switched networks. A Session Initiation Protocol (SIP) facilitates the establishment of virtual circuit switched calls between calling parties and called parties such as between an origination mobile station 106 and the destination device 118.

Depending on the particular situation, a wireless communication system may comprise a voicemail origination network 110, a voicemail destination network 102, or both. Therefore, a mobile station 106 may be used to generate a voicemail for another party or may be used to receive a voicemail deposited by the other party where the other party's communication device may be a mobile station 106 on the same wireless network or a mobile station 106 on a different wireless network. In the exemplary system shown in FIG. 1, the other party's device (destination device 118) is illustrated as connected to the origination network 110 through the destination network 102. In some situations, however, the destination network 102 and the origination network 110 may be the same network. The communication networks 102, 110 may include any number of wireless, wired, computer, Internet, or Intranet networks.

A presence server 104 includes hardware and software for receiving and storing presence information corresponding to the destination devices 118. The destination device 118 may have any of several presence states including, for example, "Busy", "Do Not Disturb", "Unavailable", and "Available". The destination devices 118 registered with the presence server 104 occasionally transmit presence status update messages to the presence server 104. When a change in presence status has occurred for a particular destination device 118, the destination device 118 provides the appropriate presence status update to the presence server 104. A change in presence status may occur automatically (e.g. without user action). For example, when the destination device is turned off by the user, prior to disconnecting the destination device 118 from the network, the destination device 118 updates the presence server status to "Powered Off". Analogously, when the device is turned back on, the presence status is automatically updated to "Available". On the other hand, a change in presence status may occur by deliberate action of the user of the destination device 118. For example, if the user is about to attend other business when he/she cannot be disturbed by real-time call alerts, but may be able to monitor text and other messages that he/she receives, the user may deliberately set the presence status to "Do not disturb", and may supplement it by recording a voice message to be accessible via presence status, which further explains reason for absence, e.g. "I am not available until 11:00 AM while attending a meeting". When a call is attempted with the destination device 118, the calling party first obtains the presence status of the destination device 118. In response, the presence server 104 provides the current presence status to the origination device. In the exemplary embodiment, a voice mail procedure can be invoked by the origination device if the destination device 118 is unavailable. In some circumstances, the presence server 104 may be a destination party proxy such as a network based entity that acts on behalf of the destination party.

In accordance with the exemplary embodiment of the invention, the mobile stations 106 exchange MMS messages including voicemail messages with the MMS-C 116. After the origination device receives a return status message indicating the destination device 118 can not receive a call, the origination party (calling party) records a voicemail message for a destination party (called party) at the origination mobile station. The voicemail message is stored, at least temporarily, in memory of the origination mobile station and is forwarded through the MMS-C 116 to the destination network 102. The voicemail message deposited for the user of the destination mobile station (118) is transferred to the destination mobile station (118) from the MMS-C 116 as an MMS message. The MMS message is stored in the memory of the destination mobile station (118) and locally played when the user accesses the voicemail. In some situations, the voicemail message may be streamed to the destination mobile station (118) allowing playback of the voicemail message before the entire message file is transferred. Therefore, a packet data message, such as a MMS message, including the recorded voicemail message is transmitted through a packet data communication link, such as a MMS communication link, to the destination network 102.

Figure 2:
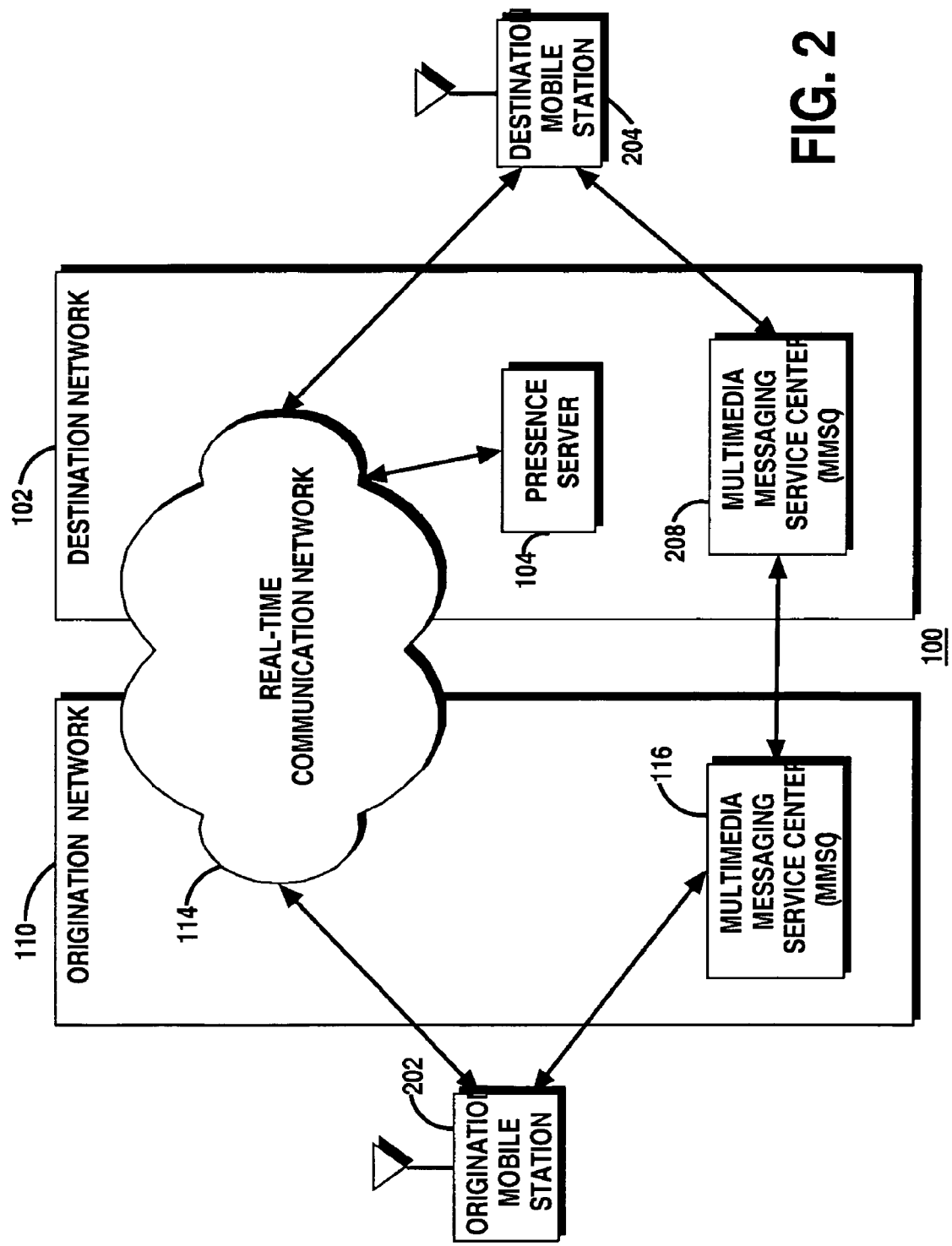
FIG. 2 is a block diagram of the exemplary communication system where a first mobile station is an originating device and a second mobile station is a destination device.

FIG. 2 is a block diagram of the exemplary communication system 100 where a first mobile station 106 is an originating device (originating mobile station 202) and a second mobile station 106 is a destination device (destination mobile station 204). In the exemplary situation discussed with reference to FIG. 2, the originating mobile station 202 communicates through the origination network 110 and the destination mobile station 204 communicates through a destination network 102 where the origination network 110 and the destination network 102 each comprise a MMS-C 116, 208 as well as IP routers that at least partially comprise the real-time communication network 114. In the interest of clarity, base stations 102 and other communication equipment are not shown in FIG. 2. The presence server 104 in the destination network 102 provides presence status services for destination devices 118 such as the destination mobile station 204. Those skilled in the art will readily recognize the various topologies, protocols, architectures, and implementations of the communication network 100 that can be used based on these teachings and known techniques. The functions and operations of the blocks described in FIG. 2 may be implemented in any number of devices, circuits, or infrastructure. Two or more of the functional blocks may be integrated in a single device and the functions described as performed in any single device may be implemented over several devices. For example, the functionality of the presence server 104 may be implemented within eMSC (not shown) or a proxy service server (not shown).

A voicemail delivery procedure is invoked when the originating mobile station 202 attempts to place a call to the destination mobile station 204 and the call can not be completed. In accordance with known techniques, the origination mobile station 202 initiates a new call through equipment in the origination network of the real-time communication network 114 to communication equipment of the destination network 204. In the exemplary embodiment, the Origination mobile station 202 sends a presence status request message before attempting a VoIP call to a destination mobile station 204. The presence server 104, or proxy server, responds to the presence status request message with a status return message. In some circumstances, the origination mobile station 202 may attempt to establish a VoIP call before, or simultaneously with, sending the presence status request message. For example an "INVITE" message may be generated and transmitted using SIP from the origination mobile station 202 along with the presence status request message. Based on information forwarded to the presence server 104 regarding the status of the destination mobile station 204, the presence server 104 generates and sends the status return message. In the exemplary embodiment, the presence status request message and the status return message are transmitted in accordance with a standardized presence server protocol such as eXtensible Markup Language (XML) Configuration Access Protocol (XCAP). The status return message includes information indicating the presence status of the destination mobile station 204 and may include a coded value indicating the status, and/or may include a multimedia file including any combination of text, audio, photographs, cartoons, and video describing the status of the destination party. In the exemplary embodiment, the multimedia information is transmitted to the origination mobile station 202 through the packet messaging system. The origination mobile station 202 presents multimedia information to the origination party. For example, the origination mobile station 202 may play an audio greeting message returned with the status return message. If the Presence Status returned from the Presence Server is "Not Available", or any other status precluding direct voice communication between the calling party and the called party, the originating mobile station 202 records a voicemail message by capturing audio signals through a microphone and/or video signals through a camera and storing a digital representation of the signals in memory. Examples of suitable audio formats include WAV, EVRC, and AMR files. An example of a suitable format for storing video or multimedia files includes the MPEG4 format. Those skilled in the art will recognize the various other formats that can be used for storing and transmitting audio, video, and multimedia files. In some circumstances, the Presence Status message may also include a list of multimedia formats that the destination device supports such as Multipurpose Internet Multimedia Extension or MIME formats. Therefore, the origination device message can be constrained to the type and format of media supported by the destination device. If the destination device is only voice and text capable, for example, the message recorded and sent by the origination device can be confined to only those types of media.

After the appropriate processing of the voicemail message file, the origination mobile station 202 generates a MMS message addressed to the destination mobile station 204 using the destination mobile address. Examples of suitable destination addresses include an email address or any address routable using Internet Protocol (IP). Since in the exemplary embodiment the call is a VoIP call, addressing information for the destination mobile station 204 is established at the time of session initiation of the virtual circuit switched call (VoIP call). Accordingly, Internet routable addressing information is available at the origination mobile station 202 or through a network-resident proxy device such as a SIP signaling controller and any MMS messages from the originating mobile station 202 to the destination mobile station 204 can be routed using the destination address used for the original VoIP call. In some situations, the destination address may be stored at the origination mobile station 202 and associated with the destination mobile station 204 telephone number. For example, an Internet routable destination address such as an email address may be stored in an address book of the origination mobile station 202.

The origination mobile station 202 generates a multimedia messaging service (MMS) message containing a file or other data representing the voicemail message. In the exemplary embodiment, the MMS message includes the voicemail message as an attached digital file and includes the destination address of the destination mobile station. The MMS message is forwarded to the MMS-C 116 and routed through the communication system to the MMS-C 208 of the destination network 102 in accordance with known MMS techniques. Generally, the MMS message is routed to a multimedia server in the MMS-C 208 based on the destination address and stored in memory at the MMS-C 208.

The MMS server in the MMS-C 208 deposits the voicemail message in the destination mobile station 204. In accordance with MMS techniques, for example, the MMS-C 208 stores the content of the MMS message and makes it available as a dynamically generated URL link to local data file. In the exemplary embodiment, a data file such as a WAV audio file representing the voicemail message is associated with the MMS message. Where the audio file cannot be deposited in the destination mobile station 204, a notification is transmitted to the destination mobile station 204 indicating that a message has arrived and is available for download. Depending on the particular configuration of the destination mobile station 204, the MMS message may be retrieved with or without user intervention. In some circumstances, the message may be streamed to the destination mobile station 204 allowing the voicemail message to be played before the entire file is transferred into the memory of the destination mobile station 204.

Although various protocols, signaling schemes, and formats can be used to deposit the MMS message in the destination mobile station 204, established MMS techniques are used in the exemplary embodiment. For example, the MMS-C 208 generates and transmits a MMS notification message to the destination mobile station 204 using a Wireless Application Protocol (WAP) "Push" procedure over Short Message Service (SMS). The MMS notification message contains a URL pointer to the dynamically generated MMS message including the audio file representing the voicemail message. After receiving the MMS notification message, the mobile station initiates a data connection that provides TCP/IP network connectivity. The destination mobile station 204 performs an HTTP (or WSP) "get" procedure to retrieve the MMS message from the MMS-C. In the exemplary embodiment, the MMS message is transmitted using any of several protocols utilized in the mobile communication systems. Examples of suitable protocols include M-IMAP, OMA-MM1, and SIP-based MM1. In addition, email protocols such as IMAP and POP can be used in some circumstances.

In the exemplary embodiment, an alert message is sent to the destination mobile station 204 after the voicemail message is received at the MMSC 120. The alert message notifies the destination mobile station 204 that a voicemail message is available at the MMSC 120. The alert message allows for notification and recovery of the voicemail message where an error has occurred with the MMS message. The alert message is transmitted to the destination mobile station 204 in accordance with known techniques and protocols. An example of a suitable method for alerting the destination mobile station 204 includes transmitting the alert message using Short Message Service (SMS) message.

Figure 3:
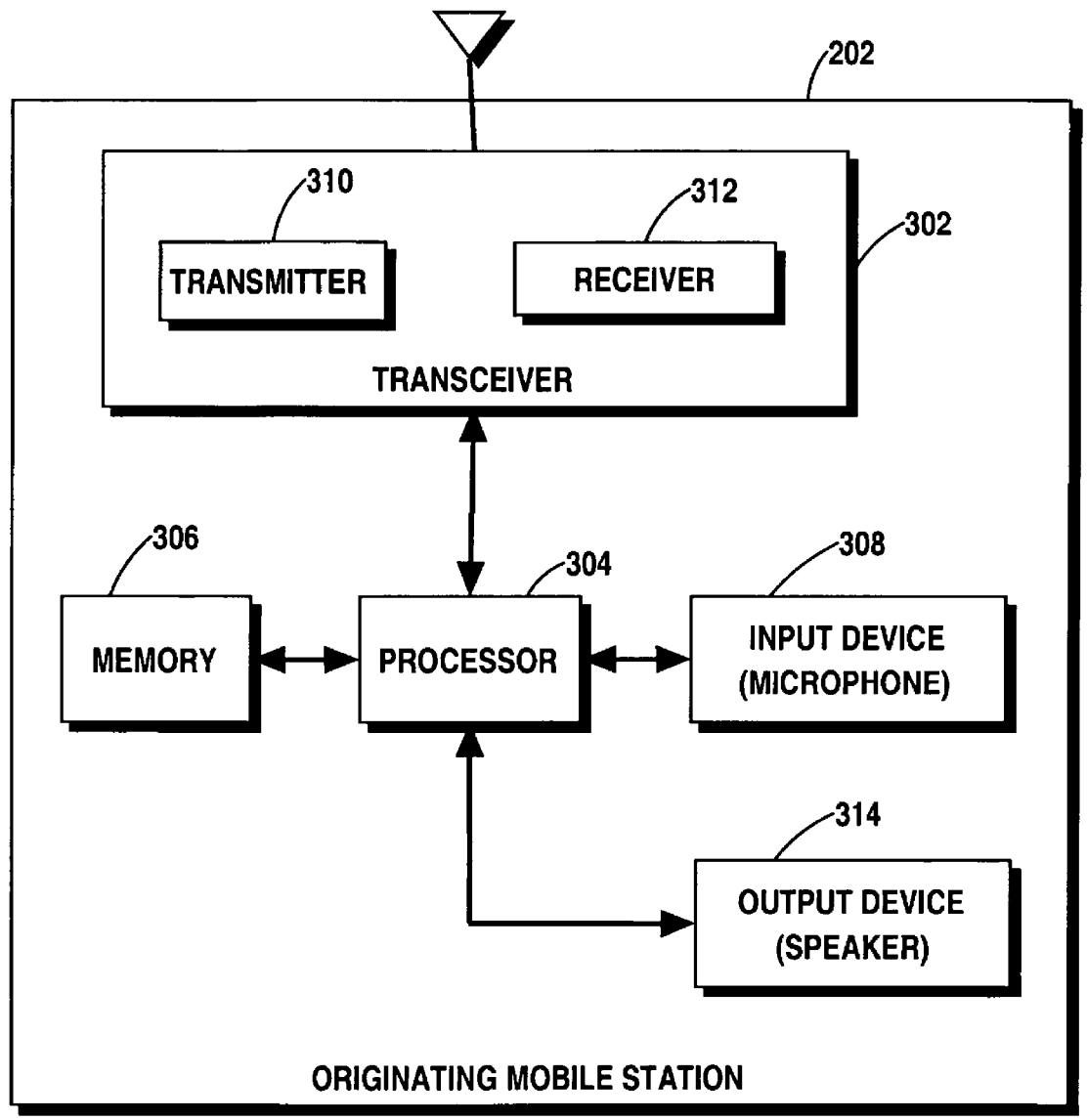
FIG. 3 is a block diagram of the origination mobile station in accordance with the exemplary embodiment of the invention.

FIG. 3 is a block diagram of the origination mobile station 202 in accordance with the exemplary embodiment of the invention. A transceiver 302 including a transmitter 310 and receiver 312 exchanges wireless signals with a base station 108 to exchange information including voice, data, video, graphics, and audio. A processor 304 facilitates the execution of the various functions of the origination mobile station 202 as well as facilitating the overall functionality of mobile station 202. The processor 304 includes a microprocessor, computer, or other processor arrangement suitable for processing computer code to facilitate the execution of the functions described herein. The processor 304 may include other circuitry such as analog to digital (AD) converters and audio processors in some circumstances. The memory 306 is any memory module, integrated circuit (IC), or other device suitable for storing digital data such as the audio files representing the voicemail message and greeting message. An input device 308 connected to the processor 304 captures any combination of audio and video. In the exemplary embodiment, the input device 308 is a microphone and the voicemail message is an audio message. Examples of other suitable input devices 308 include video cameras and digital cameras. Greeting messages and other received communications are played through an output device 314 such as an audio speaker.

A status return message is received through the receiver 312 indicating that a call can not be completed to the destination mobile station 204 at the current time. Multimedia information contained in the status return message is presented to the origination party through the output device 314 such as visual displays and audio speakers. The processor converts signals received by the input device 308 into a digital file representing the incoming signals to record the voicemail message. The file is at least temporarily stored in the memory 304 prior to inclusion in a MMS message generated by the processor 304. The message is transmitted by the transmitter 310 to the base station 108 to forward the MMS message to the MMS-C 116.

Figure 4:
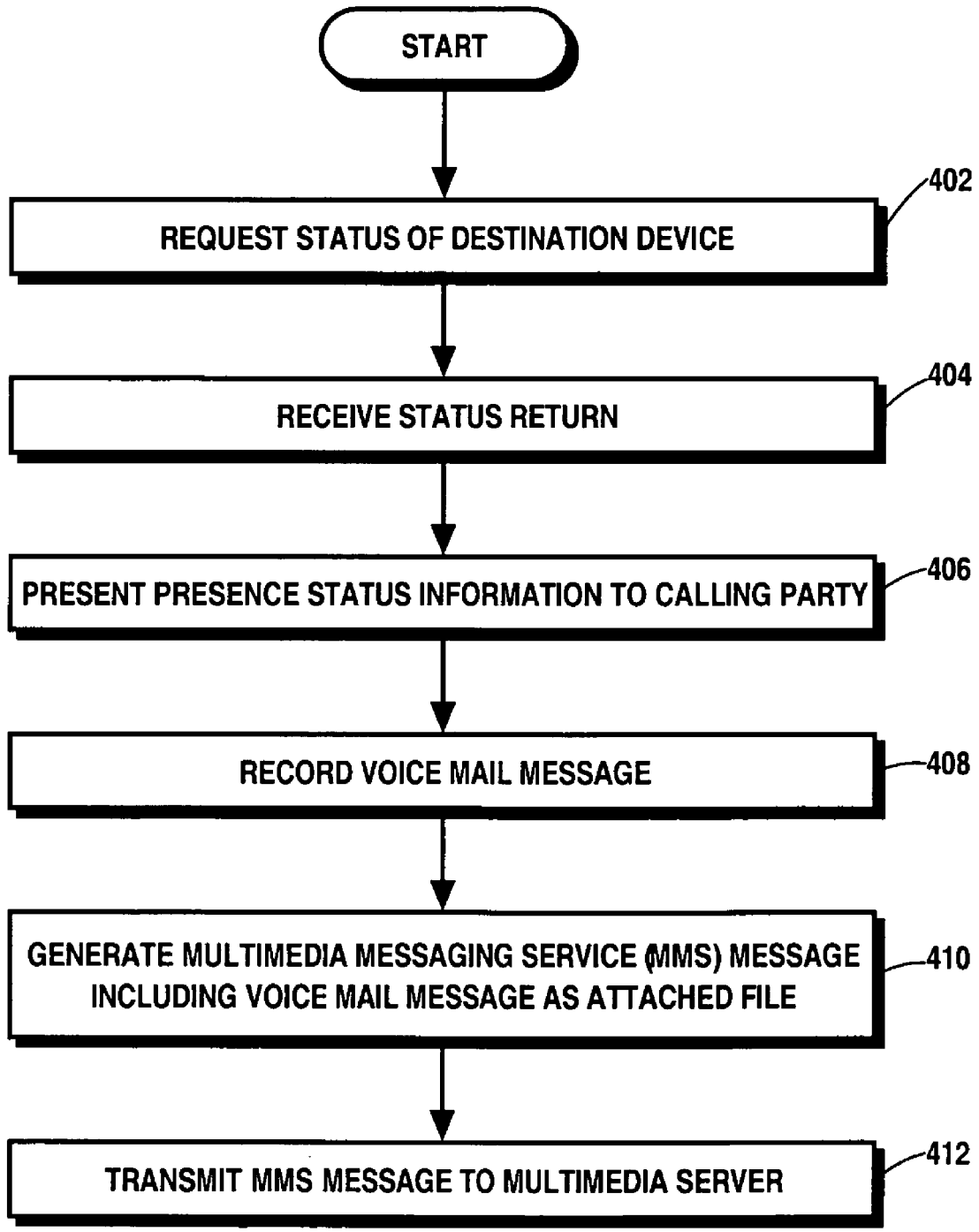
FIG. 4 is a flow chart of a method of providing voicemail service using a packet data messaging service in accordance with the exemplary embodiment of the invention.

FIG. 4 is a flow chart of a method of providing voicemail service using a packet data messaging service such as MMS in accordance with the exemplary embodiment of the invention. The method is performed in an origination mobile device 202 in the exemplary embodiment and is described with reference to a MMS system. Those skilled in the art will readily apply the techniques discussed to other types of packet data messaging system based on these teachings.

At step 402, the origination mobile station 202 requests the presence status of the destination mobile station 204 by sending a presence status request message to the presence server 104. As explained above, the presence server 104 may be a proxy of the destination mobile station 204 in some circumstances. Further, the origination mobile station 202 may request the status directly from the destination mobile station 204 in some situations. In some circumstances, the origination mobile station 202 may request the presence status when attempting to establish a VoIP call with the destination mobile station 204. For example, a presence status request may be sent in addition to an "INVITE" message in accordance with SIP protocols. In such circumstances, the call attempt is aborted when presence status indicates the destination mobile station 204 is unable to receive calls at the present time.

At step 404, a status return message is received at the origination mobile station. In the exemplary embodiment, the presence server 104 generates a status return message in response to the presence status request message. In some situations, the destination mobile station proxy may provide the status return message. The status return message describes the presence status of the destination mobile station 204 and may include a personal greeting describing the status of the destination party. The status return may include information in a variety of formats. For example, the status return message may include multimedia information such as photographs, cartoons, video, and/or text describing the presence status of the called party. The status return message may also be a value indicating presence status in accordance with a standardized status code protocol in some situations.

At step 406, presence status information is presented to the origination party. In the exemplary embodiment, a greeting message received as an audio file is played to the origination party. If the status return message includes other multimedia information such as cartoons, photographs, video clips or text, the multimedia information is displayed through the appropriate output devices 414 such as speakers and visual displays.

At step 408, a voicemail message is recorded. In the exemplary embodiment the voicemail message is an audio message recorded by a processor in the origination mobile station 202 by capturing the originating party's voice through a microphone 308. The voicemail message, however, may be any combination of audio, video, text, graphics or other multimedia information. Other devices such as cameras, for example, may be used to capture information for the voicemail message. The voicemail message is stored in memory 306 of the destination mobile station 202 as a digital file.

At step 410, a MMS message is generated by the origination mobile station 202. Using the destination address (IP routable address) of the destination mobile station 204, the origination mobile station 202 generates a MMS message and attaches the voicemail message file. In the exemplary embodiment, the IP address of the destination mobile station 204 used for the attempted VoIP call is used as the destination address. In circuit switched networks, the destination address is stored in a local database in the memory 306 or is received from the voicemail server 104. For example, the destination address may be entered by the originating party and associated with the telephone number of the destination device 204, 302. Where the voicemail server 104 provides the destination address, a message containing the destination address may be sent through the circuit-switched call or it may be forwarded to the destination mobile station 202 using MMS. Where the destination device 302 does not subscribe to the MMS, the destination address is a destination address associated with the voicemail box of the destination device 302. In some circumstances, the voicemail message file may be formatted in accordance with CODEC of the destination mobile station 204.

At step 412, the MMS message including the voicemail message file is sent to the destination device 204, 302. The MMS message is transmitted to the MMS-C 116 in accordance with known techniques.

Therefore, the exemplary embodiment efficiently provides voicemail service using MMS. Voicemail messages are deposited and retrieved using MMS minimizing the durations of real-time calls in the communication system 100. Voicemail messages deposited by a wireless user are recorded at an origination mobile station 202 and transmitted through a MMS communication link as a MMS message. Voicemail messages retrieved by a wireless user are received at a destination mobile station 204 through a MMS communication link and stored in memory at the destination mobile station 204. Employing a MMS system maximizes the efficiency of the use of wireless communication resources for voicemail services. Since a greater degree of latency can be tolerated with the transmission of a MMS message, a voicemail message can be efficiently transferred at a lower QoS (quality of service) level than required by circuit switched calls in circuit switched networks or virtual circuit switched calls in packet switched networks. In systems utilizing VoIP, efficiencies can be observed by utilizing a spectrally efficient 3G high speed radio link. Delivery can be scheduled to relieve burden of the communication networks 102, 110 during busy traffic periods. Further, delivery of the voicemail message using MMS minimizes inaccuracies and errors during delivery and maximizes voice quality since the possibility of frame errors or transcoding is minimized or eliminated. In conventional systems, for example, a voicemail message may be delivered by converting from wireless to PCM, from PCM to voice mail specific, from voicemail specific to PCM, and from PCM to wireless formats during submission. Also, features during message creation can be implemented without consuming airtime. In addition, voicemail messages may include multimedia components such as photographs, graphics, and video clips.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for providing voicemail service using presence status in a packet data messaging system, comprising:
attempting, by an origination mobile station, a Voice over Internet Protocol (VoIP) call to a destination mobile station via a packet switched network, wherein attempting the VoIP call comprises establishing a virtual circuit-switched communication link between the origination mobile station and the destination mobile station, wherein the virtual circuit-switched communication link requires a certain quality of service (QoS) level, and wherein an Internet Protocol (IP) address of the destination mobile station is used for the attempted VoIP call;
transmitting, by the origination mobile station, a presence status request message to a presence server simultaneously with attempting the VoIP call, wherein the presence status request message is transmitted via the packet switched network, wherein the presence server is a network-based entity that is separate from the destination mobile station, wherein the presence server provides presence status services for a plurality of destination devices including the destination mobile station, and wherein the presence status request message is transmitted to the presence server in accordance with a standardized presence server protocol;
receiving at the origination mobile station a status return message indicating a presence status for the destination mobile station, wherein the status return message is received via the packet switched network, wherein the status return message comprises a coded value indicating the presence status in accordance with a standardized status code protocol, wherein the status return message also comprises a multimedia file describing the presence status, wherein the status return message is received from the presence server in response to transmission of the presence status request message, wherein the status return message is, received in accordance with the standardized presence server protocol, and wherein the status return message identifies at least one multimedia format that the destination mobile station supports;
presenting, to a user of the origination mobile station, multimedia information from the multimedia file that describes the presence status, wherein the multimedia information comprises an audio greeting message in addition to at least one of a photograph, a cartoon, and video describing the presence status;
determining whether the presence status for the destination mobile station precludes direct voice communication between the origination mobile station and the destination mobile station at the present time; and
if the presence status for the destination mobile station precludes direct voice communication between the origination mobile station and the destination mobile station at the present time:
aborting the VoIP call and tearing down the virtual circuit-switched communication link between the origination mobile station and the destination mobile station;

selecting, by the origination mobile station, a format for a voicemail message that is supported by the destination mobile station based on information in the status return message;

recording the voicemail message at the origination mobile station, wherein the voicemail message comprises audio and at least one of video, text and graphics, wherein recording the voicemail message comprises storing audio signals in a digital file;

transmitting, by the origination mobile station, a multimedia messaging service message including the voicemail message from the origination mobile station to a multimedia messaging service center, wherein the digital file is included in the multimedia messaging service message as an attachment, wherein the digital file is stored in memory of the origination mobile station at least temporarily before the digital file is included in the multimedia messaging service message, wherein the multimedia messaging service message is addressed to the IP address of the destination mobile station that was used for the attempted VoIP call, wherein the multimedia messaging service message is transmitted via the packet switched network, wherein the multimedia messaging service message is transmitted at a lower QoS level than is required for the virtual circuit-switched communication link, and wherein the multimedia messaging service message is transmitted via a channel having a higher data transfer rate than the virtual circuit-switched communication link; and scheduling, by the origination mobile station, delivery of the multimedia messaging service message to relieve burden on the packet switched network during busy traffic periods.

2. An origination mobile station for providing voicemail service using presence status in a packet data messaging system, comprising:

a processor;

memory in electronic communication with the processor; and computer code stored in memory, the computer code being executable by the processor to:

attempt, by the origination mobile station, a Voice over Internet Protocol (VoIP) call to a destination mobile station via a packet switched network, wherein attempting the VoIP call comprises establishing a virtual circuit-switched communication link between the origination mobile station and the destination mobile station, wherein the virtual circuit-switched communication link requires a certain quality of service (QoS) level, and wherein an Internet Protocol (IP) address of the destination mobile station is used for the attempted VoIP call;

transmit, by the origination mobile station, a presence status request message to a presence server simultaneously with attempting the VoIP call, wherein the presence status request message is transmitted via the packet switched network, wherein the presence server is a network-based entity that is separate from the destination mobile station, wherein the presence server provides presence status services for a plurality of destination devices including the destination mobile station, and wherein the presence status request message is transmitted to the presence server in accordance with a standardized presence server protocol;

receive at the origination mobile station a status return message indicating a presence status for the destination mobile station, wherein the status return message is received via the packet switched network, wherein the status return message comprises a coded value indicating the presence status in accordance with a standardized status code protocol, wherein the status return message also comprises a multimedia file describing the presence status, wherein the status return message is received from the presence server in response to transmission of the presence status request message, wherein the status return message is received in accordance with the standardized presence server protocol, and wherein the status return message identifies at least one multimedia format that the destination mobile station supports;

present, to a user of the origination mobile station, multimedia information from the multimedia file that describes the presence status, wherein the multimedia information comprises an audio greeting message in addition to at least one of a photograph, a cartoon, and video describing the presence status;

determine whether the presence status for the destination mobile station precludes direct voice communication between the origination mobile station and the destination mobile station at the present time; and if the presence status for the destination mobile station precludes direct voice communication between the origination mobile station and the destination mobile station at the present time:

abort the VoIP call and tearing down the virtual circuit-switched communication link between the origination mobile station and the destination mobile station;

select, by the origination mobile station, a format for a voicemail message that is supported by the destination mobile station based on information in the status return message;

record the voicemail message at the origination mobile station, wherein the voicemail message comprises audio and at least one of video, text and graphics, wherein recording the voicemail message comprises storing audio signals in a digital file;

transmit, by the origination mobile station, a multimedia messaging service message including the voicemail message from the origination mobile station to a multimedia messaging service center, wherein the digital file is included in the multimedia messaging service message as an attachment, wherein the digital file is stored in memory of the origination mobile station at least temporarily before the digital file is included in the multimedia messaging service message, wherein the multimedia messaging service message is addressed to the IP address of the destination mobile station that was used for the attempted VoIP call, wherein the multimedia messaging service message is transmitted via the packet switched network, wherein the multimedia messaging service message is transmitted at a lower QoS level than, is required for the virtual circuit-switched communication link, and wherein the multimedia messaging service message is transmitted via a channel having a higher data transfer rate than the virtual circuit-switched communication link; and schedule, by the origination mobile station, delivery of the multimedia messaging service message to relieve burden on the packet switched network during busy traffic periods.

3. An origination mobile station for providing voicemail service using presence status in a packet data messaging system, comprising:

means for attempting, by the origination mobile station, a Voice over Internet Protocol (VoIP) call to a destination mobile station via a packet switched network, wherein attempting the VoIP call comprises establishing a virtual circuit-switched communication link between the origination mobile station and the destination mobile station, wherein the virtual circuit-switched communication link requires a certain quality of service (QoS) level, and wherein an Internet Protocol (IP) address of the destination mobile station is used for the attempted VoIP call;

means for transmitting, by the origination mobile station, a presence status request message to a presence server simultaneously with attempting the VoIP call, wherein the presence status request message is transmitted via the packet switched network, wherein the presence server is a network-based entity that is separate from the destination mobile station, wherein the presence server provides presence status services for a plurality of destination devices including the destination mobile station, and wherein the presence status request message is transmitted to the presence server in accordance with a standardized presence server protocol;

means for receiving at the origination mobile station a status return message indicating a presence status for the destination mobile station, wherein the status return message is received via the packet switched network, wherein the status return message comprises a coded value indicating the presence status in accordance with a standardized status code protocol, wherein the status return message also comprises a multimedia file describing the presence status, wherein the status return message is received from the presence server in response to transmission of the presence status request message, wherein the status return message, is received in accordance with the standardized presence server protocol, and wherein the status return message identifies at least one multimedia format that the destination mobile station supports;

means for presenting, to a user of the origination mobile station, multimedia information from the multimedia file that describes the presence status, wherein the multimedia information comprises an audio greeting message in addition to at least one of a photograph, a cartoon, and video describing the presence status;

means for determining whether the presence status for the destination mobile station precludes direct voice communication between the origination mobile station and the destination mobile station at the present time;

means for aborting the VoIP call and tearing down the virtual circuit-switched communication link between the origination mobile station and the destination mobile station;

means for selecting, by the origination mobile station, a format for a voicemail message that is supported by the destination mobile station based on information in the status return message;

means for recording the voicemail message at the origination mobile station, wherein the voicemail message comprises audio and at least one of video, text and graphics, wherein recording the voicemail message comprises storing audio signals in a digital file;

means for transmitting, by the origination mobile station, a multimedia messaging service message including the voicemail message from the origination mobile station to a multimedia messaging service center, wherein the digital file is included in the multimedia messaging service message as an attachment, wherein the digital file is stored in memory of the origination mobile station at least temporarily before the digital file is included in the multimedia messaging service message, wherein the multimedia messaging service message is addressed to the IP address of the destination mobile station that was used for the attempted VoIP call, wherein the multimedia messaging service message is transmitted via the packet switched network, wherein the multimedia messaging service message is transmitted at a lower QoS level than is required for the virtual circuit-switched communication link, and wherein the multimedia messaging service message is transmitted via a channel having a higher data transfer rate than the virtual circuit-switched communication link; and means for scheduling, by the origination mobile station, delivery of the multimedia messaging service message to relieve burden on the packet switched network during busy traffic periods;

wherein the acts of aborting the VoIP call, selecting the format for the voicemail message, recording the voicemail message, transmitting the multimedia messaging service message, and scheduling delivery of the multimedia messaging service message are performed if the presence status for the destination mobile station precludes direct voice communication between the origination mobile station and the destination mobile station at the present time.

4. Memory having computer code to cause a processor to:

attempt, by an origination mobile station, a Voice over Internet Protocol (VoIP) call to a destination mobile station via a packet switched network, wherein attempting the VoIP call comprises establishing a virtual circuit-switched communication link between the origination mobile station and the destination mobile station, wherein the virtual circuit-switched communication link requires a certain quality of service (QoS) level, and wherein an Internet Protocol (IP) address of the destination mobile station is used for the attempted VoIP call;

transmit, by the origination mobile station, a presence status request message to a presence server simultaneously with attempting the VoIP call, wherein the presence status request message is transmitted via the packet switched network, wherein the presence server is a network-based entity that is separate from the destination mobile station, wherein the presence server provides presence status services for a plurality of destination devices including the destination mobile station, and wherein the presence status request message is transmitted to the presence server in accordance with a standardized presence server protocol;

receive at the origination mobile station a status return message indicating a presence status for the destination mobile station, wherein the status return message is received via the packet switched network, wherein the status return message comprises a coded value indicating the presence status in accordance with a standardized status code protocol, wherein the status return message also comprises a multimedia file describing the presence status, wherein the status return message is received from the presence server in response to transmission of the presence status request message, wherein the status return message, is received in accordance with the standardized presence server protocol, and wherein the status return message identifies at least one multimedia format, that the destination mobile station supports;

present, to a user of the origination mobile station, multimedia information from the multimedia file that describes the presence status, wherein the multimedia information comprises an audio greeting message in addition to at least one of a photograph, a cartoon, and video describing the presence status;

determine whether the presence status for the destination mobile station precludes direct voice communication between the origination mobile station and the destination mobile station at the present time; and if the presence status for the destination mobile station precludes direct voice communication between the origination mobile station and the destination mobile station at the present time:

abort the VoIP call and tearing down the virtual circuit-switched communication link between the origination mobile station and the destination mobile station;

select, by the origination mobile station, a format for a voicemail message that is supported by the destination mobile station based on information in the status return message;

record the voicemail message at the origination mobile station, wherein the voicemail message comprises audio and at least one of video, text and graphics, wherein recording the voicemail message comprises storing audio signals in a digital file;

transmit, by the origination mobile station, a multimedia messaging service message including the voicemail message from the origination mobile station to a multimedia messaging service center, wherein the digital file is included in the multimedia messaging service message as an attachment, wherein the digital tile is stored in memory of the origination mobile station at least temporarily before the digital file is included in the multimedia messaging service message, wherein the multimedia messaging service message is addressed to the IP address of the destination mobile station that was used for the attempted VoIP call, wherein the multimedia messaging service message is transmitted via the packet switched network, wherein the multimedia messaging service message is transmitted at a lower QoS level than is required for the virtual circuit-switched communication link, and wherein the multimedia messaging service message is transmitted via a channel having a higher data transfer rate than the virtual circuit-switched communication link; and schedule, by the origination mobile station, delivery of the multimedia messaging service message to relieve burden on the packet switched network during busy traffic periods.

* * * * *